United States Patent
Neema et al.

(10) Patent No.: US 10,746,123 B2
(45) Date of Patent: Aug. 18, 2020

(54) DEEP REINFORCEMENT LEARNING FOR AIR HANDLING AND FUEL SYSTEM REFERENCING

(71) Applicant: Cummins Inc., Columbus, IN (US)

(72) Inventors: Kartavya Neema, Columbus, IN (US); Vikas Narang, Columbus, IN (US); Govindarajan Kothandaraman, Columbus, IN (US); Shashank Tamaskar, West Lafayette, IN (US)

(73) Assignee: Cummins Inc., Columbus, IN (US)

( * ) Notice: Subject to any disclaimer, the term of this patent is extended or adjusted under 35 U.S.C. 154(b) by 53 days.

(21) Appl. No.: 16/106,300

(22) Filed: Aug. 21, 2018

(65) Prior Publication Data
US 2020/0063681 A1    Feb. 27, 2020

(51) Int. Cl.
*F02D 41/24*    (2006.01)
*F02D 41/14*    (2006.01)
(Continued)

(52) U.S. Cl.
CPC ..... *F02D 41/2441* (2013.01); *F02D 41/0062* (2013.01); *F02D 41/1479* (2013.01); *F02D 41/18* (2013.01); *F02D 41/2438* (2013.01); *F02D 41/2445* (2013.01); *F02D 41/2451* (2013.01); *F02D 41/2454* (2013.01); *F02D 41/28* (2013.01); *G06N 3/08* (2013.01);
(Continued)

(58) Field of Classification Search
CPC ............ F02D 41/2441; F02D 41/2445; F02D 41/2451; F02D 41/2454; F02D 41/2438; F02D 41/18; F02D 41/1479; F02D 41/062; F02D 41/28; F02D 2041/281; F02D 2200/0406; G06N 20/00; G06N 3/08
USPC .................................... 123/674, 695
See application file for complete search history.

(56) References Cited

U.S. PATENT DOCUMENTS 5,351,193 A * 9/1994 Poirier .................. F02D 41/004
123/519
5,743,244 A * 4/1998 Bush ..................... F02D 41/047
123/674

(Continued)

*Primary Examiner* — Mahmoud Gimie
(74) *Attorney, Agent, or Firm* — Faegre Drinker Biddle & Reath LLP (57) ABSTRACT

An engine system includes an air handling and fuel system whose states are managed by a reference managing unit. The engine system has a plurality of sensors whose sensor signals at least partially define a current state of the engine system. The reference managing unit includes a controller which controls the air handling and fuel system of the engine system as well as a processing unit coupled to the sensors and the controller. The processing unit includes an agent which learns a policy function that is trained to process the current state, determines air handling references and fuel system references by using the policy function after receiving the current state as an input, and outputs the air handling references and fuel system references to the controller. Then, the agent receives a next state and a reward value from the processing unit and updates the policy function using a policy evaluation algorithm and a policy improvement algorithm based on the received reward value. Subsequently, the controller controls the air handling and fuel system of the engine in response to receiving the air handling references and the fuel system references.

18 Claims, 4 Drawing Sheets

(51) Int. Cl.
  *F02D 41/00*   (2006.01)
  *G06N 3/08*    (2006.01)
  *F02D 41/18*   (2006.01)
  *F02D 41/28*   (2006.01)
  *G06N 20/00*   (2019.01)

(52) U.S. Cl.
  CPC ....... *G06N 20/00* (2019.01); *F02D 2041/281* (2013.01); *F02D 2200/0406* (2013.01)

(56) References Cited

U.S. PATENT DOCUMENTS

| | | | |
|---|---|---|---|
| 6,378,515 B1* | 4/2002 | Geyer | F02D 21/08 |
| | | | 123/683 |
| 6,405,122 B1* | 6/2002 | Yamaguchi | F02D 41/1404 |
| | | | 701/106 |
| 6,705,301 B2* | 3/2004 | Dollmeyer | F02D 41/0007 |
| | | | 123/568.22 |
| 7,150,266 B2 | 12/2006 | Nakayama et al. | |
| 8,527,182 B2 | 9/2013 | Minami et al. | |
| 8,600,917 B1* | 12/2013 | Schimert | G06N 20/00 |
| | | | 706/14 |
| 8,612,107 B2 | 12/2013 | Malikopoulos | |
| 9,567,930 B2 | 2/2017 | Sakayanagi et al. | |
| 2004/0158387 A1* | 8/2004 | Yasui | F02D 41/1402 |
| | | | 701/108 |
| 2006/0212209 A1* | 9/2006 | Cesario | F02D 35/023 |
| | | | 701/106 |
| 2010/0050600 A1* | 3/2010 | Suzuki | F01N 3/0842 |
| | | | 60/276 |
| 2013/0199177 A1* | 8/2013 | Holberg | F02D 41/144 |
| | | | 60/605.2 |
| 2014/0338636 A1* | 11/2014 | Irie | F02D 41/0062 |
| | | | 123/436 |
| 2015/0292443 A1* | 10/2015 | Arslanturk | F02D 41/0007 |
| | | | 60/605.2 |
| 2016/0025028 A1 | 1/2016 | Vaughan | |
| 2017/0107928 A1* | 4/2017 | Cancellieri | F02D 41/402 |

* cited by examiner

DEEP REINFORCEMENT LEARNING FOR AIR HANDLING AND FUEL SYSTEM REFERENCING

FIELD OF THE DISCLOSURE

This disclosure relates generally to air handling and fuel system referencing controller for engines, and more specifically to systems with real-time self-learning air handling and fuel system referencing controls.

BACKGROUND OF THE DISCLOSURE

Recently, there has been an increased demand for engine systems with internal combustion engines to meet criteria such as improved fuel economy and reduced emissions, all the while maintaining optimal performance for the user, which led to the development of technologies such as fuel injection systems, turbocharging, and exhaust gas recirculation that made the engines much more environmentally-friendly without sacrificing satisfactory user experience. As a result, more emphasis is placed on the optimization of multiple criteria, which includes balancing fuel economy, emissions, and engine performance to achieve as much as possible in all criteria at the same time, by controlling variables within the engine system in a stochastic environment, a process generally referred to as engine tuning.

Specifically, it is desirable to control an air handling system of an internal combustion engine, particularly during transient events, to provide for a responsive air handling system capable of responding appropriately to transient operating conditions. As such, the internal combustion engine, which uses a turbocharger and an exhaust gas recirculation (EGR) system to control the air flow inside the cylinder, requires efficient engine tuning to fully utilize the available components and achieve optimal performance.

Figure 1:
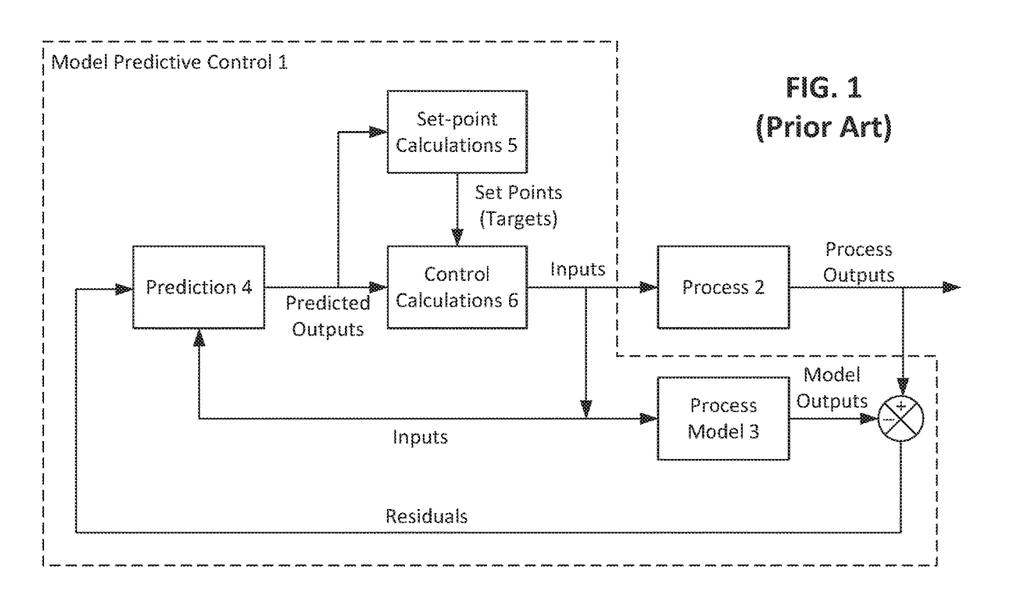
FIG. 1 is a block diagram of a prior-art model predictive control system.

Prior art techniques of engine tuning include model-based air handling controllers which employ model predictive controllers (MPC). A block diagram of such MPC system is illustrated in FIG. 1, which is largely divided into a MPC block 1 and a process block 2. The system uses a process model 3 (which acts parallel to the process 2), a prediction block 4, a set-point calculations block 5, and a control calculations block 6 to predict the current process outputs. The residuals, which are the difference between the predicted model outputs and the actual process outputs, are fed back into the prediction block 4, along with the inputs from the control calculations block 6 which receives the predicted outputs from the prediction block 4 and set points (targets) from the set-point calculations block 5 to determine the actual inputs to enter into the process 2. Thus, the system uses residuals to correct its future predictions such that adjustments are made to more closely match the process model 3 with the process 2. As such, the accuracy of the initial model used in the process model 3 is very important, since the computations depend heavily on how accurate the model 3 is with respect to the performance of the actual process 2. Also, MPC typically incorporates linear functions to imitate the actual process that is dynamic in nature. Therefore, attempting to approximate dynamic models as linear functions may not capture the actual behavior of the process, thereby leading to poor performance by the system. Furthermore, linear models may be able to predict the current outputs within a finite time-horizon, but tend to be computationally expensive for high dimensional problem solved over longer time-horizon. Even if nonlinear models are incorporated to approximate the dynamic models, MPC would result in determining a local optimal solution which may not be the best solution, i.e. the global optimal solution. Also, MPC is computationally expensive and therefore cannot be implemented in engine control units.

Other prior art techniques include for example engine mapping. This technique conducts a series of tests on the engine and the program which controls it, and implements steady-state engine response as control variables to determine the inputs to the engine, which establishes the operating limits of the engine and sets control input bias with respect to the operating point, known as a steady-state calibration. Then, these input settings are graphically represented in the form of a characteristic map, which shows the performance curves that represent performance of the engine when there is a change in certain parameters such as speed, load, air-fuel ratio, as well as engine/ambient temperature. Most of the calibration techniques utilized rely on a person to perform off-line calibration and optimization and subsequently plug in values in the engine control module (ECM) for engine operation. These techniques apply post-processing to data collected in a controlled environment for calibration and optimization. However, off-line calibration requires a lot of statistics and data to prepare the engine for actual use, during which the engine will likely encounter situations and states that are not covered by the initial static dataset used for off-line calibration. As such, because real operating conditions can be drastically different from the conditions during calibration, such techniques are not adequate in adapting the engine to real conditions as it operates. Similar maps are designed for transient states that are tuned via trial-and-error processes where the calibrator runs different duty cycles and calibrate to meet the expected performance. Because it is not possible to run all the duty cycles in practice, such processes may lead to suboptimal performance for some cycles. Furthermore, because the calibration techniques are performed to model the engine behavior only in steady state, during the transient state the engine is controlled to meet a specific objective such as smoke or torque response, and thus other variables such as fuel consumption are typically given less weight when considering such factors during engine operation.

Therefore, there is a need to provide a more computationally efficient, real-time engine tuning technique which allows for a more accurate prediction of the actual engine behavior in a dynamic style to enable optimization of the air handling and fueling system within the engine, all the while reducing the dependency on the accuracy of the initial prediction model and frequent calibrations.

SUMMARY OF THE DISCLOSURE

Various embodiments of the present disclosure relate to a deep reinforcement learning for air handling and fuel system referencing of an engine system, particularly to an internal combustion engine system. In one embodiment, the engine system includes an air handling and fuel system whose states are managed by a reference managing unit. The engine system has a plurality of sensors coupled to it such that the sensor signals from these sensors at least partially define a current state of the engine system. The reference managing unit includes a controller which controls the air handling and fuel system of the engine system as well as a processing unit coupled to the sensors and the controller. The processing unit includes an agent which learns a policy function that is trained to process the current state, determines air handling references and fuel system references by using the policy function after receiving the current state as an input, and outputs the air handling references and fuel system references to the controller. Then, the agent receives a next state and a reward value from the processing unit and updates the policy function using a policy evaluation algorithm and a policy improvement algorithm based on the received reward value. Subsequently, the controller controls the air handling and fuel system of the engine in response to receiving the air handling references and the fuel system references.

For example, the current state can be defined by one or more of the following parameters: speed value, load value, air handling states, and fuel system states of the engine system. In another example, the current state can also have past values of these parameters, such as the speed value at a previous time step, the load value at a previous time step, and so on. Also, the air handling states can be determined by one or more of the following factors: charge flow value, exhaust gas recirculation (EGR) fraction values, EGR flow commands, fresh air flow command, intake manifold pressure command, exhaust manifold pressure command, and other suitable air handling state commands such as the turbocharger speed command; likewise, the fuel system states can be determined by one or more of the following factors: fuel concentration values, rail pressure value, and start of injection (SOI) values. Also for example, the air handling references include one or more of the following commands: charge flow command, EGR fraction commands, EGR flow commands, fresh air flow command, and intake manifold pressure command. Reward values are an approximate function that is derived from one or more of the following parameters: smoke value, emission value, torque response value, and fuel concentration in the engine.

In some embodiments, the agent is made of a plurality of function approximators. The function approximators used in these cases can be deep neural networks (DNN), support vector machines (SVM), regression-based methods, and decision trees. Also, DNN can include long short-term memory (LSTM) networks and convolution neural networks. Furthermore, the DNN are trained using an optimization technique with (a) steady state data and (b) transient state data of the engine system as inputs. Examples of such optimization technique are q-learning and policy gradients.

While multiple embodiments are disclosed, still other embodiments of the present disclosure will become apparent to those skilled in the art from the following detailed description, which shows and describes illustrative embodiments of the disclosure. Accordingly, the drawings and detailed description are to be regarded as illustrative in nature and not restrictive.

BRIEF DESCRIPTION OF THE DRAWINGS

The embodiments will be more readily understood in view of the following description when accompanied by the below figures and wherein like reference numerals represent like elements. These depicted embodiments are to be understood as illustrative of the disclosure and not as limiting in any way.

While the present disclosure is amenable to various modifications and alternative forms, specific embodiments have been shown by way of example in the drawings and are described in detail below. The intention, however, is not to limit the present disclosure to the particular embodiments described. On the contrary, the present disclosure is intended to cover all modifications, equivalents, and alternatives falling within the scope of the present disclosure as defined by the appended claims.

DETAILED DESCRIPTION OF THE DISCLOSURE

In the following detailed description, reference is made to the accompanying drawings which form a part hereof, and in which is shown by way of illustration specific embodiments in which the present disclosure is practiced. These embodiments are described in sufficient detail to enable those skilled in the art to practice the present disclosure, and it is to be understood that other embodiments can be utilized and that structural changes can be made without departing from the scope of the present disclosure. Therefore, the following detailed description is not to be taken in a limiting sense, and the scope of the present disclosure is defined by the appended claims and their equivalents.

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments. Furthermore, the described features, structures, or characteristics of the subject matter described herein may be combined in any suitable manner in one or more embodiments.

Figure 2:
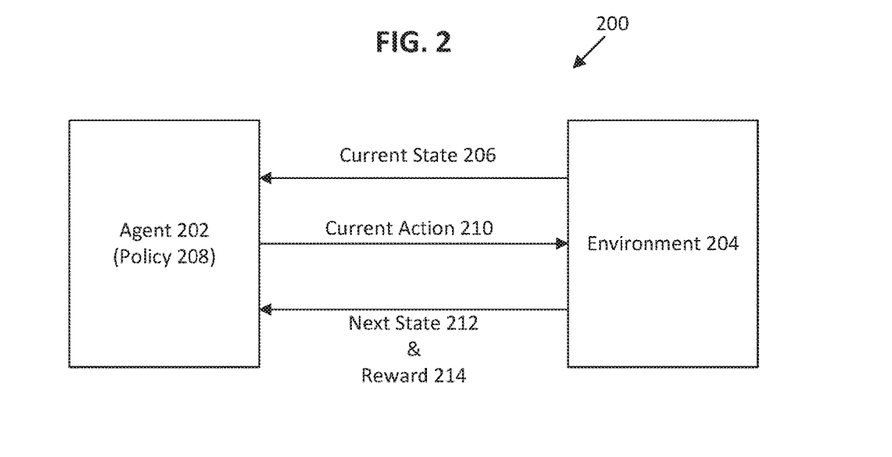
FIG. 2 is a block diagram of a general reinforcement learning technique as described herein.

FIG. 2 illustrates a high-level depiction of a basic reinforcement learning algorithm 200. Reinforcement learning is a machine learning technique which shares a structure similar to traditional control systems, hence well-suited towards control applications. There are two main components required for learning: an agent 202 and an environment 204. The agent 202 is a processing device such as a computing unit which has a memory to store instructions and other data necessary to perform the process, and the environment 204 is one or more components within the system which gives feedback to the agent 202 to allow the agent 202 to improve its prediction of the system's actual behavior. For example, the agent can be a deep learning neural model that takes states as an input and finds the actions as an output. Initially, the environment 204 sends a current state 206 of the environment 204 to the agent 202. In response, the agent 202 runs a set of rules known as a policy 208 which assists in determining what actions to take based on the current state. The policy can be a set of instructions stored in the memory of the deep learning neural model. As a result, the agent 202 outputs a current action 210 to the environment 204. The environment 204 then returns a next state 212 and a reward 214. The goal of the agent 202 is to find the policy 208 that maximizes the sum of the reward 214 over a time horizon. In other words, the agent 202 does not only consider the immediate reward received from the environment 204 as a result of the action 210 which caused the reward, but also future rewards which the agent 202 may receive in the long term, when determining the action 210. Details regarding this algorithm 200 will be further explained below in view of the engine systems illustrated in FIGS. 3 and 4.

Figure 3:
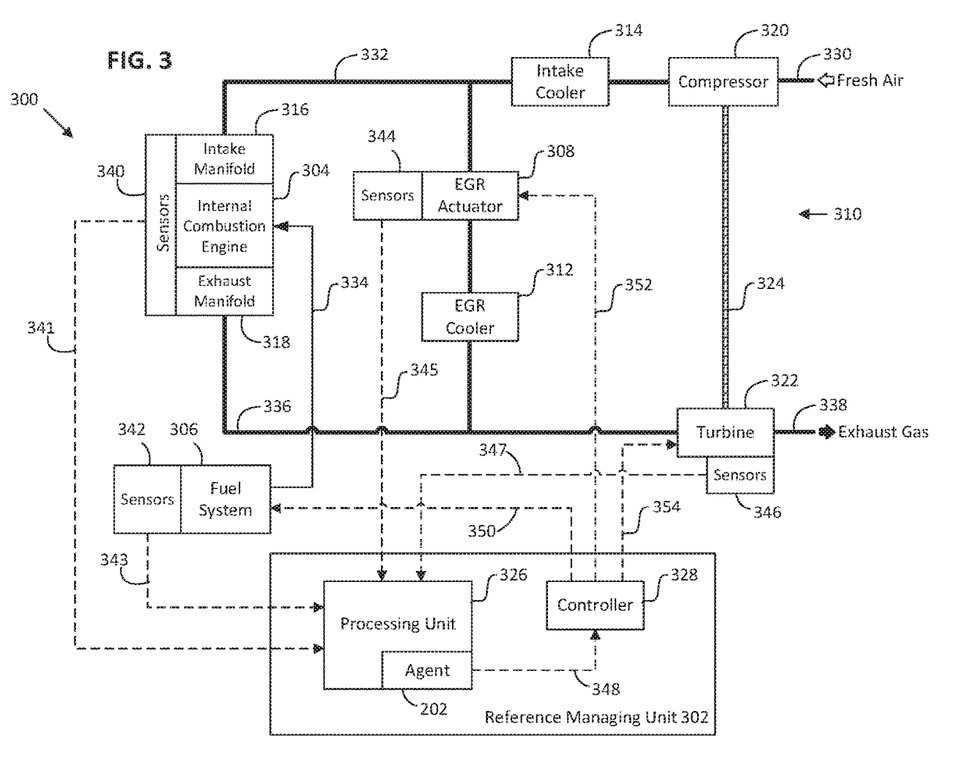
FIG. 3 is a block diagram of an internal combustion engine system utilizing the reinforcement learning technique as described herein.

FIG. 3 illustrates an embodiment of an internal combustion engine system 300 which includes a reference managing unit 302, an internal combustion engine 304, a fuel system 306, an exhaust gas recirculation (EGR) actuator 308, and a turbocharger 310. Additionally, EGR cooler 312 and intake cooler 314 each cools the air or exhaust gas passing through them before being received by the internal combustion engine 304. In the figure, bold lines indicate the flowpath of air and gases through the system, and the dashed lines indicate data signal transmitted via wires or wirelessly as appropriate between each component in the system. The solid line between the fuel system 306 and the engine 304 represents one or more fuel lines in a fuel passageway 334 which delivers fuel from the fuel system 306 to the engine 304. The engine 304 has an intake manifold 316 as well as an exhaust manifold 318. The fuel system 306 includes fuel tank, fuel supply pump, fuel filter, fuel heaters and coolers, and other components of a fuel injection system, as appropriate. The turbocharger 310 includes a compressor 320 and a turbine 322 connected with a rotatable shaft 324. The reference managing unit 302 includes a processing unit 326 and a controller 328. The flowpath begins at a fresh air inlet 330 where fresh air, also referred to as charge air, enters the system from the atmosphere, the movement of which is assisted by activating the compressor 320 which forces more air into the system. Then, the intake cooler 314 cools the air supplied by the compressor 320 and sends it to an intake air passageway 332 leading to the intake manifold 316 of the engine. At the same time, fuel is injected from the fuel system 306 through a fuel passageway 334 after which the fuel and air are used to create combustion within the engine to move the motor when a sparkplug (not shown) ignites the mixture of fuel and air inside the internal combustion engine 304, if the engine 304 is a spark ignition engine. Otherwise, if the engine 304 is a compression ignition engine such as a diesel engine, for example, the heat and pressure created by the engine 304 during the compression process causes ignition of the engine. The exhaust gas leaves the exhaust manifold 318 through an exhaust gas passageway 336 to the EGR cooler 312 and the turbine 322. Exhaust gas reenters the engine through the intake manifold 316 when the EGR actuator 308 is enabled, and the exhaust gas drives the turbine 322 causing the shaft 324 to rotate and thereby causing the compressor 320 to force air into the system. As such, the EGR actuator 308 and the turbocharger 310 work together to increase air flow into the intake manifold 316 and the speed of the engine. The leftover exhaust gas exits the system through an exhaust conduit 338.

Furthermore, the engine system 300 incorporates a high-pressure EGR system in which the EGR actuator 308 recirculates exhaust gas between the two high-pressure points, i.e. the exhaust manifold and the inlet manifold. In another embodiment shown in FIG. 4, a low-pressure EGR system is used for an internal combustion engine system 400, in which the EGR actuator 308 is positioned in a separate location such that it recirculates exhaust gas between the two low-pressure points, i.e. the exhaust conduit (also referred to as the exhaust tail pipe) and the turbocharger inlet. This engine system 400 does not require a separate cooler as it did in the engine system 300 because both the exhaust gas and the incoming air would pass through the same intake cooler 314. Furthermore, in another embodiment, the engine system can have more than one EGR actuator and turbocharger which can improve the air handling efficiency of the engine system.

Activation of the EGR actuator 308, fuel system 306, and turbine 322 help to increase the speed of the engine, but they must be controlled to achieve optimal efficiency within the system. In other words, it is desirable for the engine to maintain some of these components in a deactivated state when there is no need for an increase in the speed of the engine, such as, if the engine system is incorporated into a car, when the user is driving on a road with a lower speed limit than a freeway or the driving style of the user indicates that he or she tends to drive at a more moderate speed. As such, a current state of the engine system may be used in determining whether such activation is necessary. In the reinforcement learning technique of FIG. 2, the current state of the system is determined by taking measurements in each component of the engine system using a plurality of sensors. For example, a set of sensors 340 coupled to the intake manifold 316, internal combustion engine 304, and the exhaust manifold 318 can measure engine parameters including but not limited to the inlet temperature, inlet flow rate, charge pressure, and engine speed. Sensors 342 coupled to the fuel system 306 can measure the fuel concentration in the system and an amount of fuel remaining in the fuel tank. Sensors 344 coupled to the EGR actuator 308 can measure the differential pressure, or $\Delta P$, across the actuator and the exhaust gas flow rate of the through the actuator. Sensors 346 coupled to the turbine 322 can measure the rotational speed of the turbocharger and the amount of $NO_x$ and particulate matter in the exhaust gas exiting the system. These are only examples of what parameters can be measured by the sensors; other conventional sensors can also be used as appropriate.

Figure 4:
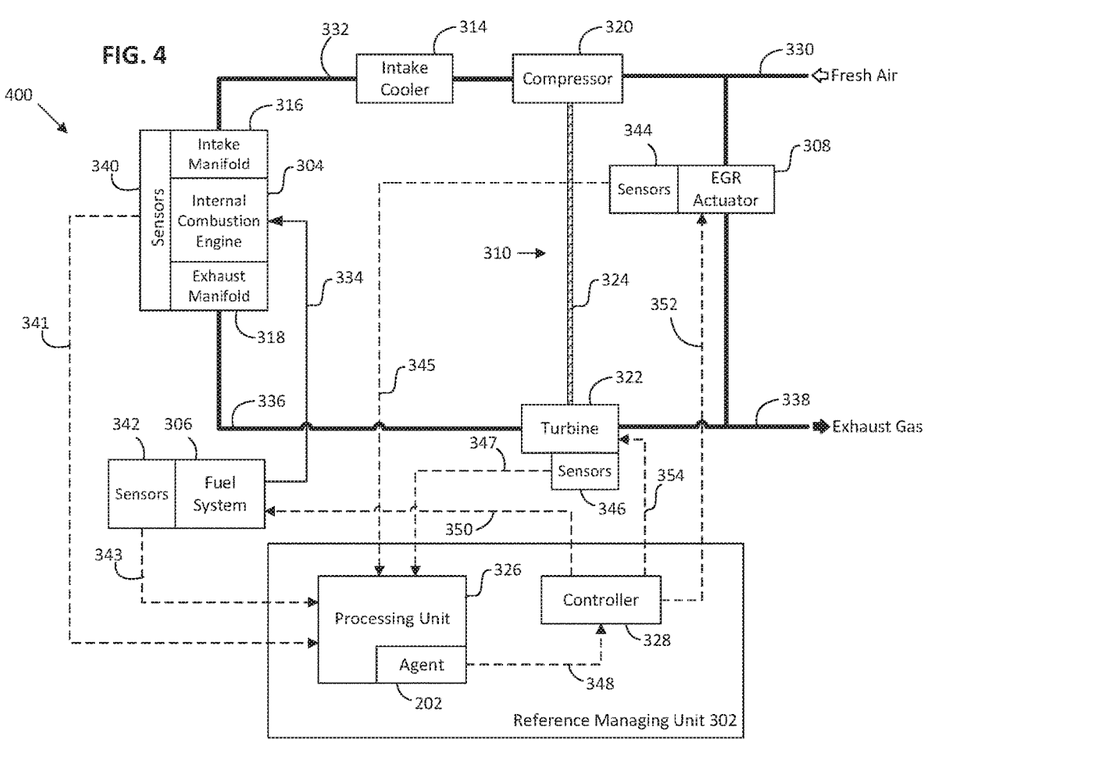
FIG. 4 is a block diagram of another internal combustion engine system utilizing the reinforcement learning technique as described herein.

Measurements from the sensors 340, 342, 344, and 346 are sent as sensor signals 341, 343, 345, and 347, respectively, to the processing unit 326 which uses these data to determine the next actions to be taken by the controller 328. The processing unit 326 includes the agent 202 from FIG. 2 which performs this determination. In one example, the agent 202 is a plurality of function approximators which take in the data from the processing unit 326 as input and output a command signal 348 to the controller 328, where the process used by the function approximators can be any known machine learning architecture such as deep neural networks (DNN), support vector machines (SVM), regression-based methods (which includes logistic, lasso, ridge, etc.), and decision trees, as appropriate. In one example, the DNN can be long short-term memory (LSTM) networks or convolution neural networks, or other appropriate types of network or conventional networks known in the art.

The function approximators act to approximate how the engine behaves under different conditions using a reinforcement learning technique as explained in FIG. 2. For the internal combustion engine systems 300 and 400, the environment 204 includes the internal combustion engine 304, the fuel system 306, the EGR system 308, the turbocharger 310, or any other component which may affect the state of the environment.

In one example, the states of the internal combustion engine system include one or more of: the engine speed, the engine load (torque output of the engine), the air handling states, and the combustion states. The air handling states include one or more of: the charge flow of the engine (the sum of air flow into the intake manifold of the engine) and the EGR fraction (the fraction of charge flow attributable to recirculated exhaust gas from the engine). Additionally, the air handling states also include one or more of: prior EGR flow commands, fresh air flow command, and intake manifold pressure command as previously sent by the controller. The fuel system states include one or more of: the fuel concentration in the engine, the rail pressure in the fuel injection system, and the start-of-injection (SOI), or injection timing of the fuel into the engine. Furthermore, although FIGS. 3 and 4 show engine systems with a high-pressure EGR system and a low-pressure EGR system, respectively, some embodiments can include both high- and low-pressure EGR configurations in one system, such that the exhaust gas has two opportunities to recirculate back into the engine system, which can further increase the efficiency of the engine.

Figure 5:
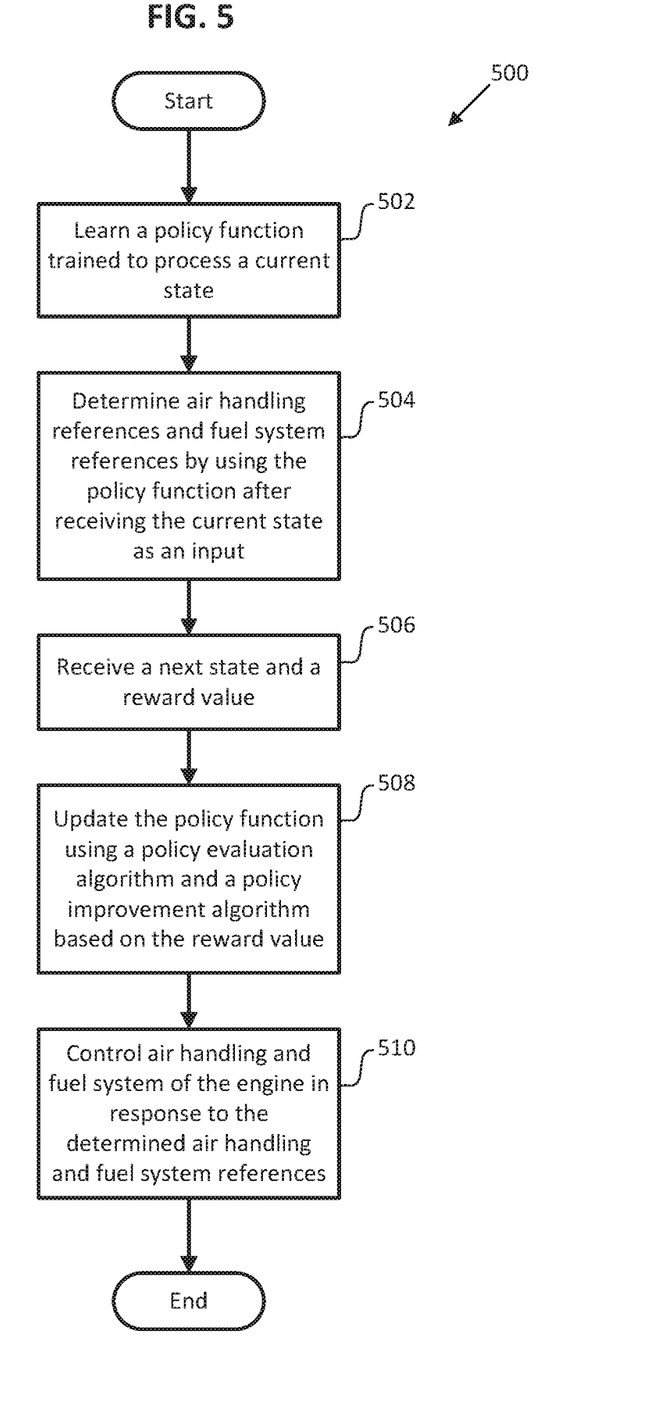
FIG. 5 is a flow diagram of an algorithm for the reinforcement learning technique used with respect to the internal combustion engine system.

FIG. 5 illustrates a flow diagram of a method 500 executed by the agent 202 to control the air handling and fuel system of the engine systems 300 and 400. Firstly, the agent learns a policy function trained to process a current state in step 502. Then, the agent determines the air handling references and fuel system references by using the policy function after receiving the current state as an input in step 504. The agent subsequently receives the next state and the next reward value from the environment in step 506, and updates the policy function using a policy evaluation algorithm and a policy improvement algorithm based on the reward value in step 508. In some examples, more than one such algorithm can be used to further improve the policy. Lastly, the agent controls air handling and fuel system of the engine in response to the determined air handling and fuel system references in step 510.

A detailed explanation of the reinforcement learning technique is described below in view of the engine systems illustrated in FIGS. 3 and 4. Initially, the processing unit 326 receives the sensor signals 341, 343, 345, and 347 from the corresponding components in the engine system. Then, the processing unit 326 determines the current state of the engine system using an algorithm programmed into the processing unit. For example, in one embodiment, the processing unit 326 can process the raw sensor signal data and determine the relevant data which indicate a need for certain actions to take place, such as by comparing the sensor signal data values to predetermined threshold values, and send the processed data indicating the initial current state $x_0$ to the agent.

The agent 202 has a policy $\pi$ which is the starting function for the learning technique. A policy $\pi$ is a function which considers the current state $x_t$ to output a corresponding action $u_t$, expressed as $u_t=\pi(x_t)$. As such, the policy $\pi$ determines the initial action $u_0$ and sends a command signal 348 to the controller 328. The controller 328 then sends the appropriate command signals 350, 352, and 354 to the fuel system 306, the EGR actuator 308, and the turbine 322 of the turbocharger 310, respectively, based on the command signal 348 which includes the air handling references and the fuel system references. The air handling references can include commands regarding the charge flow, EGR fraction, the EGR flow, the fresh air flow, and the intake manifold pressure. For example, the air handling references decide how much air should be brought into the system and how fast should this be done, as well as how much of the exhaust gas should be recirculated back into the engine and how much pressure should be in the intake manifold. The fuel system references can include commands regarding the fueling, the rail pressure, and the SOI. For example, the fuel system references decide how much fuel needs to be inserted into the engine and at what speed, as well as the necessary pressure in the rail to achieve such fuel injection and the timing of the fuel injection.

After the command signals are applied, the engine system (i.e. the environment) enters the next state, after which the sensors provide new measurements to the processing unit 326, which uses these updated sensor signals to calculate the new current state $x_1$ of the environment and sends the data to the agent 202, along with a first reward $r_0$ which is a scalar value. The processing unit 326 stores a program which calculates the reward, i.e. a reward function R such that $r_t=R(u_t, x_t, x_{t+1})$, to send to the agent 202. For example, the reward is an approximate function derived from the smoke value and its surrogates (for example the air-to-fuel ratio and the in-cylinder oxygen content), the emission value (calculated using for example the $NO_x$ value and the particulate matter value as measured by the sensors 346 connected to the exhaust conduit 338) a torque response value of the engine, and the fueling amount from the fuel system 306. In another example, the reward is a weighted summation of the above parameters as outputted by the engine system, such that more weight can be placed on some features than others. Once the agent 202 receives the first reward $r_0$, the agent 202 determines the next action $u_1$ by using the policy $\pi$ based on the current state $x_1$, i.e. $u_1=\pi(x_1)$.

To evaluate the quality of the policy $\pi$, a value function V is calculated such that $$V(\pi(x_N))=\Sigma_{t=0}^{N}(\gamma^t r_t) \qquad (1)$$

for a time horizon from t=0 to t=N. When the N value approaches infinity (i.e. the system runs for a prolonged period of time) the value function V can represent a receding horizon problem, which is useful in understanding the global stability properties of any local optimization that is determined by the policy. In the function, $\gamma$ is the discount factor between 0 and 1 which denotes how much weight is placed on future rewards in comparison with the immediate rewards. The discount factor $\gamma$ is necessary to make the sum of rewards converge, and this denotes that future rewards are preferred at a discounted rate with respect to the immediate reward. The policy $\pi$ must act in a way to increase as much reward gained as possible, therefore the goal of the agent 202 is to find a policy $\pi$ that maximizes a sum of the reward over the time horizon, i.e. max $\Sigma_{t=0}^{N}(\gamma^t r_t)$.

The policy $\pi$ is also constantly improved using policy evaluation and policy improvement algorithms. During a policy evaluation process, the value function $V(\pi)$ is calculated for some, or all, of the states x based on a fixed policy $\pi$. Then, during a policy improvement process which follows, the policy $\pi$ is improved by using the value function $V(\pi)$ obtained in the policy evaluation step such that a value function $V(\pi')$ calculated using the new policy $\pi'$ is greater than or equal to the value function $V(\pi)$ calculated using the original policy $\pi$. These two processes are repeated one after another until either (a) the policy $\pi$ remains unchanged, (b) the processes continue for more than a predetermined period of time, or (c) the change to the value function V is less than a predetermined threshold. In one embodiment, the agent is trained using the steady state data and the transient state data of the engine system. That is, the agent learns to start the engine system while the engine is in a steady state, i.e. not turned on, and during the transient state of the engine system, i.e. while the engine is running. By training the system in both settings, the engine system can start and control the air handling and fuel injection system effectively and efficiently.

Numerous different approaches can be taken to achieve the goal of maximizing the sum of reward. Some of the approaches are model-based (an explicit model of the environment is estimated and an optimal policy is computed for the estimated model) and model-free (the optimal policy is learned without first learning an explicit model, such as value-function based learning that is related to the dynamic programming principles). One example of a model-free approach is an optimization technique known as "q-learning". The q-learning technique develops and updates a map $Q(x_t, u_t)$ which is similar to a value function that gives an estimate sum of rewards $r_t$ for a pair of a given state $x_t$ and action $u_t$. This map is initialized with a starting value and successively updated by observing the reward using an update function, as explained below. The map function is described by the following equation:

$$Q(x_t,u_t) \leftarrow (1-\alpha)Q(x_t,u_t) + \alpha(r_t + \gamma \max_u Q(x_{t+1},u)) \quad (2)$$

where $Q(x_t,u_t)$ is the old value, a is a learning rate between 0 and 1, $\max_u Q(u,x_{t+1})$ is the estimate of the optimal future value, and $(r_t+\gamma \max_u Q(x_{t+1},u))$ is the learned value. As such, the old value is replaced by a new value, which is the old value transformed using the learning rate and the learned value as shown in the equation (2). The q-learning is an off-policy value-based learning technique, in which the value of the optimal policy is learned independently of the agent's actions chosen for the next state, in contrast to on-policy learning techniques like "policy gradient" which can also be used as a learning technique for the engine system as described herein. Advantages of q-learning technique includes being more successful at finding a global optimum solution rather than just a local maximum.

A policy gradient technique is a direct policy method which starts with learning a map from state to action, and adjusts weights of each action by using gradient descent with the feedback from the environment. For any expected return function $J(\theta)$, the policy gradient technique searches for a local maximum in $J(\theta)$ so the expected return function $$J(\theta) = E\{\Sigma_{k=0}^{H} a_k r_k\} \quad (3)$$

is optimized where $a_k$ denotes time-step dependent weighting factors often set to $a_k = \gamma^k$ for discounted reinforcement learning, by ascending the gradient of the policy with respect to the parameter $\theta$, i.e.

$$\Delta\theta = \alpha \nabla_\theta J(\theta) \quad (4)$$

where $\nabla_\theta J(\theta)$ is the policy gradient and a is a step-size parameter, the policy gradient being:

$$\nabla_\theta J(\theta) = \begin{bmatrix} \frac{\partial J(\theta)}{\partial \theta_1} \\ \vdots \\ \frac{\partial J(\theta)}{\partial \theta_n} \end{bmatrix}. \quad (5)$$

The policy gradient can then be calculated or approximated using methods such as finite difference methods and likelihood ratio methods. As such, the policy gradient technique guarantees that the system will converge to reach a local maximum for the expected returns. Furthermore, other model-free algorithms, such as SARSA (state-action-reward-state-action) algorithm, deep Q network (DQN) algorithm, deep deterministic policy gradient (DDPG) algorithm, trust region policy optimization (TRPO) algorithm, and proximal policy optimization (PPO) algorithm, can also be used.

Because reinforcement learning shares a structure similar to a traditional control system, advantages of using such a technique includes the ability to capture non-linearity of the model to a high precision, resulting in improved performance. Current calibration techniques model engine behaviors in steady state and involve having technicians perform the calibration and optimization off-line and plug in the values for engine operation. Reinforcement learning can reduce such a calibration effort because the reinforcement learning technique can optimally meet all performance indexes for the engine system. Furthermore, the reinforcement learning utilizes on-line optimization with data collected in real conditions (such as when the engine is in operation) to calibrate and optimize the parameters within the engine, which allows the engine to adapt to changes in the operating condition without needing to recalibrate. As such, due to the adaptive nature of the reinforcement learning technique, even when the engine is running in a non-calibrated condition, the engine can learn or calibrate relevant parameters on its own to deliver similar levels of performance.

Furthermore, the aforementioned air handling and fueling system can be used for other types of engines besides the internal combustion engines as described above. For example, the engine of a plug-in hybrid electric vehicles combines a gasoline or diesel engine with an electric motor with a rechargeable battery, such that the battery initially drives the car and the conventional engine takes over when the battery runs out. In such an instance, the air handling and fueling system can be programmed to activate after the vehicle switches its power source from the battery to the conventional engine. Also, electric vehicles which uses only electric motors or traction motors for propulsion can also include such air handling and fueling systems. In this case, the fueling system is replaced with the battery and the DC controller which delivers varying levels of power according to the potentiometer installed in the car, and the air handling system for the engine is replaced by a climate control system for the interior of the car, such as a power heating and air conditioning system, for example.

The present subject matter may be embodied in other specific forms without departing from the scope of the present disclosure. The described embodiments are to be considered in all respects only as illustrative and not restrictive. Those skilled in the art will recognize that other implementations consistent with the disclosed embodiments are possible.

What is claimed is:

1. A reference managing unit for air handling and fuel system of an engine system, comprising:
   a plurality of sensors coupled to the engine system, wherein sensor signals from the plurality of sensors at least partially define a current state;
   a controller operable to control the air handling and fuel system of the engine system; and
   a processing unit coupled to the sensors and the controller, the processing unit comprising an agent operative to:
   learn a policy function trained to process the current state, determine air handling references and fuel system references by using the policy function after receiving the current state as an input, output the air handling references and fuel system references to the controller, receive a next state and a reward value comprises a weighted summation of at least two of: a smoke value, an emission value, a torque response value, or fuel concentration in the engine, from the processing unit, and update the policy function using a policy evaluation algorithm and a policy improvement algorithm based on the reward value, wherein the controller controls the air handling and fuel system of the engine in response to the air handling references and fuel system references.

2. The reference managing unit of claim 1, wherein the current state comprises one or more of: a speed value, a load value, air handling states, and fuel system states of the engine system.

3. The reference managing unit of claim 2, wherein:
the air handling states comprise one or more of: a charge flow value, exhaust gas recirculation (EGR) fraction values, EGR flow commands, a fresh air flow command, and an intake manifold pressure command; and
the fuel system states comprise one or more of: fuel concentration values, a rail pressure value, and start of injection (SOI) values.

4. The reference managing unit of claim 1, wherein:
the air handling references comprise one or more of: a charge flow command, EGR fraction commands, EGR flow commands, a fresh air flow command, and an intake manifold pressure command; and
the fuel system references comprise one or more of: a fueling command, a rail pressure command, and a SOI command.

5. The reference managing unit of claim 1, wherein the agent comprises a plurality of function approximators, the function approximators comprising one or more of: deep neural networks, support vector machines (SVM), regression based methods, and decision trees.

6. The reference managing unit of claim 5, wherein the deep neural networks comprise one or more of: long short-term memory (LSTM) networks and convolution neural networks.

7. The reference managing unit of claim 5, wherein the plurality of deep neural networks are trained with (a) steady state data and (b) transient state data of the engine system, by using an optimization technique comprising one or more of: q-learning and policy gradients.

8. A method for managing air handling and fuel system references for an engine, comprising:
learning a policy function trained to process a current state;
determining air handling references and fuel system references by using the policy function after receiving the current state as an input;
receiving a next state and a reward value comprising a weighted summation of at least two of: a smoke value, an emission value, a torque response value, or fuel concentration in the engine;
updating the policy function using a policy evaluation algorithm and a policy improvement algorithm based on the reward value; and
controlling air handling and fuel system of the engine in response to the determined air handling references and fuel system references.

9. The method of claim 8, wherein the current state comprises one or more of: a speed value, a load value, air handling states, and fuel system states of the engine system.

10. The method of claim 9, wherein:
the air handling states comprise one or more of: a charge flow value, exhaust gas recirculation (EGR) fraction values, EGR flow commands, a fresh air flow command, and an intake manifold pressure command; and
the fuel system states comprise one or more of: a fuel concentration value, a rail pressure value, and start of injection (SOI) values.

11. The method of claim 8, wherein:
the air handling references comprise one or more of: a charge flow command, EGR fraction commands, EGR flow commands, a fresh air flow command, and an intake manifold pressure command; and
the fuel system references comprise one or more of: a fueling command, a rail pressure command, and a SOI command.

12. The method of claim 8, wherein the agent comprises a plurality of function approximators, the function approximators comprising one or more of: deep neural networks, support vector machines (SVM), regression based methods, and decision trees.

13. The method of claim 12, wherein the deep neural networks comprise one or more of: long short-term memory (LSTM) networks and convolution neural networks.

14. The method of claim 12, wherein the plurality of deep neural networks are trained with (a) steady state data and (b) transient state data of the engine system by using an optimization technique comprising one or more of: q-learning and policy gradients.

15. An internal combustion engine system, comprising:
an internal combustion engine;
at least one exhaust gas recirculation actuator;
at least one turbocharger;
an exhaust conduit;
a plurality of sensors coupled to the at least one exhaust gas recirculation actuator, the internal combustion engine, and the exhaust conduit, the sensor signals from the plurality of sensors at least partially defining a current air handling states and current combustion states;
a controller operable to control the at least one exhaust gas recirculation actuator and the at least one turbocharger; and
a reference managing unit for air handling and combustion coupled to the sensors and the controller, the reference managing unit comprising a plurality of function approximators trained with (a) steady state data and (b) transient state data of the engine system by using an optimization technique, wherein the plurality of deep neural networks are operative to interact with the engine system to:
learn a policy function trained to process the current air handling state and the current combustion state, determine air handling references and combustion references by using the policy function after receiving the current air handling state and the current combustion state as an input, output the air handling references and combustion references to the controller, receive a next state and a reward value comprising a weighted summation of at least two of: a smoke value, an emission value, a torque response value, or fuel concentration in the engine from the processing unit, and update the policy function using a policy evaluation algorithm and a policy improvement algorithm based on the reward value,
wherein the controller controls the at least one exhaust gas recirculation actuator and the at least one turbocharger in response to the air handling references and combustion references.

16. The internal combustion engine system of claim 15, wherein the current state comprises a speed value, a load value, air handling states, and combustion states of the engine system.

17. The reference managing unit of claim 15, wherein:
the air handling states comprise one or more of: a charge flow value, exhaust gas recirculation (EGR) fraction values, EGR flow commands, a fresh air flow command, and an intake manifold pressure command;
the combustion states comprise one or more of: fuel concentration values, a rail pressure value, and start of injection (SOI) values,
the air handling references comprise one or more of: a charge flow command, EGR fraction commands, EGR flow commands, a fresh air flow command, and an intake manifold pressure command, and
the combustion references comprise one or more of: a fueling command, a rail pressure command, and a SOI command.

18. The reference managing unit of claim 15, wherein the function approximators comprise one or more of: deep neural networks, support vector machines (SVM), regression based methods, and decision trees.

* * * * *